United States Patent
Williamson

(10) Patent No.: US 10,443,348 B2
(45) Date of Patent: Oct. 15, 2019

(54) FLAPPER AND SEAT WITH A HARD AND SOFT SEAL FOR A SUBSURFACE SAFETY VALVE

(71) Applicant: Halliburton Energy Services, Inc., Houston, TX (US)

(72) Inventor: Jimmie Robert Williamson, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 152 days.

(21) Appl. No.: 15/531,630

(22) PCT Filed: Dec. 31, 2014

(86) PCT No.: PCT/US2014/073058
§ 371 (c)(1),
(2) Date: May 30, 2017

(87) PCT Pub. No.: WO2016/108910
PCT Pub. Date: Jul. 7, 2016

(65) Prior Publication Data
US 2017/0335658 A1 Nov. 23, 2017

(51) Int. Cl.
*E21B 34/00* (2006.01)
*E21B 34/10* (2006.01)
(Continued)

(52) U.S. Cl.
CPC ............ *E21B 34/101* (2013.01); *E21B 21/08* (2013.01); *E21B 34/00* (2013.01); *E21B 34/10* (2013.01);
(Continued)

(58) Field of Classification Search
CPC ........ E21B 34/101; E21B 21/08; E21B 34/10; E21B 2033/005; E21B 2034/005; F16K 15/003
See application file for complete search history.

(56) References Cited

U.S. PATENT DOCUMENTS 4,583,596 A 4/1986 Davis
4,674,575 A 6/1987 Guess
(Continued)

OTHER PUBLICATIONS

"Safety Systems—Optimax Series Safety Valves—Providing the highest reliability record in the industry," Weatherford Brochure, Publication No. 10987.01, 2013-2016, 8 pages.
(Continued)

*Primary Examiner* — Yong-Suk Ro
(74) *Attorney, Agent, or Firm* — Scott Richardson; Baker Botts L.L.P.

(57) ABSTRACT

A flapper and seat assembly, and systems and methods utilizing such assembly, are provided. The flapper and seat assembly includes a tubular metallic seat having a bore therethrough. The tubular metallic seat is one solid unit. The flapper and seat assembly further includes a hinge coupled to the tubular metallic seat and a flapper. The flapper is pivotally mounted to the hinge such that it is rotatable between an open position and a closed position. The flapper and seat assembly also includes a secondary sealing element located between the flapper and the tubular metallic seat. The secondary sealing element is one of an undulating or curved lip seal. The flapper and seat assembly further includes a seal that is formed between a sealing surface of the flapper and a sealing surface of the tubular metallic seat. The seal comprises an angle measured from a plane perpendicular to the centerline of the flapper and seat assembly.

20 Claims, 8 Drawing Sheets

(51) Int. Cl.
  *E21B 21/08* (2006.01)
  *F16K 15/03* (2006.01)
  *E21B 33/00* (2006.01)

(52) U.S. Cl.
  CPC ...... *F16K 15/033* (2013.01); *E21B 2033/005* (2013.01); *E21B 2034/005* (2013.01)

(56) References Cited

U.S. PATENT DOCUMENTS

| | | |
|---|---|---|
| 5,263,847 A | 11/1993 | Akkerman et al. |
| 6,851,477 B2 | 2/2005 | Hill, Jr. et al. |
| 2003/0121664 A1 | 7/2003 | Hill, Jr. et al. |
| 2010/0175887 A1* | 7/2010 | Henschel .............. E21B 34/101 166/373 |
| 2010/0230109 A1 | 9/2010 | Lake et al. |
| 2010/0301242 A1* | 12/2010 | Patton .................... E21B 34/10 251/129.01 |
| 2011/0290344 A1* | 12/2011 | Groesbeck .............. E21B 21/10 137/430 |
| 2012/0012202 A1 | 1/2012 | Smith et al. |

OTHER PUBLICATIONS

International Search Report and Written Opinion issued in related PCT Application No. PCT/US2014/073058 dated Sep. 16, 2015, 15 pages.

International Preliminary Report on Patentability issued in related Application No. PCT/US2014/073058, dated Jul. 13, 2017 (12 pages).

\* cited by examiner

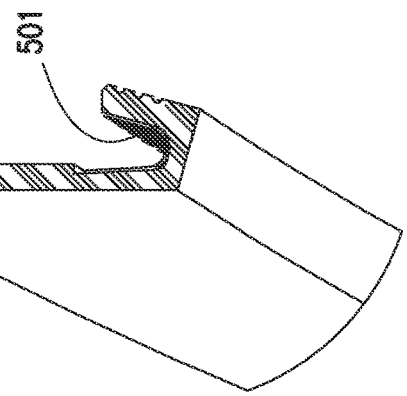
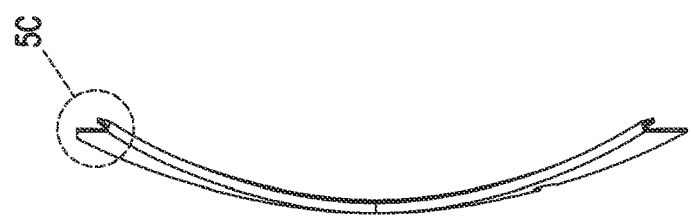
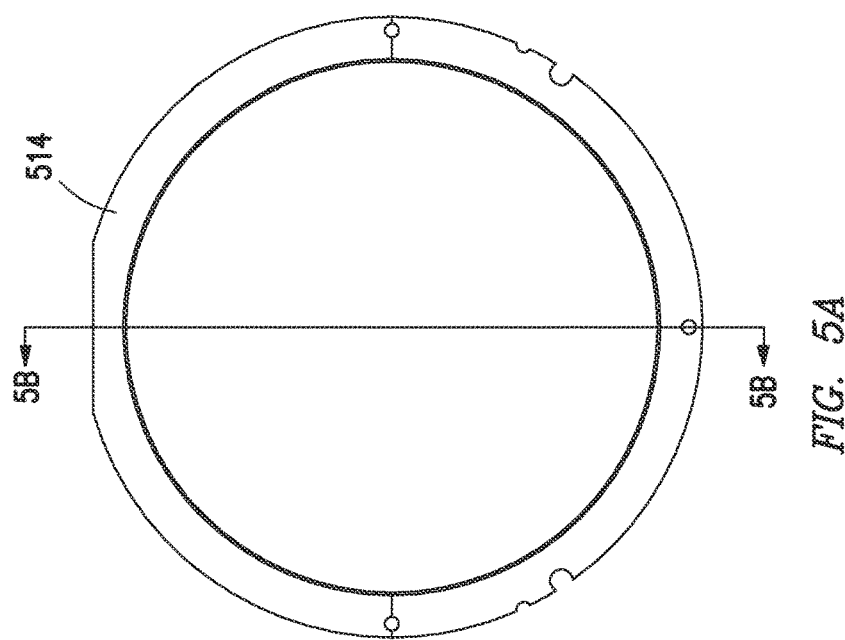

FLAPPER AND SEAT WITH A HARD AND SOFT SEAL FOR A SUBSURFACE SAFETY VALVE

CROSS-REFERENCE TO RELATED APPLICATION

The present application is a U.S. National Stage Application of International Application No. PCT/US2014/073058 filed Dec. 31, 2014, which is incorporated herein by reference in its entirety for all purposes.

BACKGROUND

The present invention relates to systems and methods for use in subterranean operations. More particularly, the present disclosure relates to a subsurface safety valve used in conjunction with such operations.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it may be desirable to close off a well in the event of an uncontrolled condition that may damage property, injure personnel or cause pollution. One of the mechanisms used to close off a well is a Surface Controlled Subsurface Safety Valve ("SCSSV"). Such SCSSVs are typically fitted into the production tubing and operate to block the flow of formation fluid upwardly through the production string. The SCSSV provides for automatic shutoff of production flow in response to one or more well safety conditions that can be sensed and/or indicated at the surface, for example, a fire on the platform, high/low line pressure condition, high/low flow line temperature condition, and operator override. Traditionally, during production, the SCSSV is held open by the application of hydraulic fluid pressure conducted to the SCSSV through an auxiliary control conduit which is extended along the tubing string within the annulus between the tubing and the well casing.

A SCSSV typically includes a flapper. The flapper is a closure member that may be pivotally mounted such that it is rotatable between a first "open" position and a second "closed" position. When in the closed position, the flapper may substantially close off the well. SCSSVs are often made with many small, specialized parts that are costly to implement and/or replace.

BRIEF DESCRIPTION OF THE DRAWINGS

FIG. 5A-5C show schematic views of an undulating spring loaded lip seal of an exemplary flapper and seat assembly in accordance with an illustrative embodiment of the present disclosure.

Figure 1:
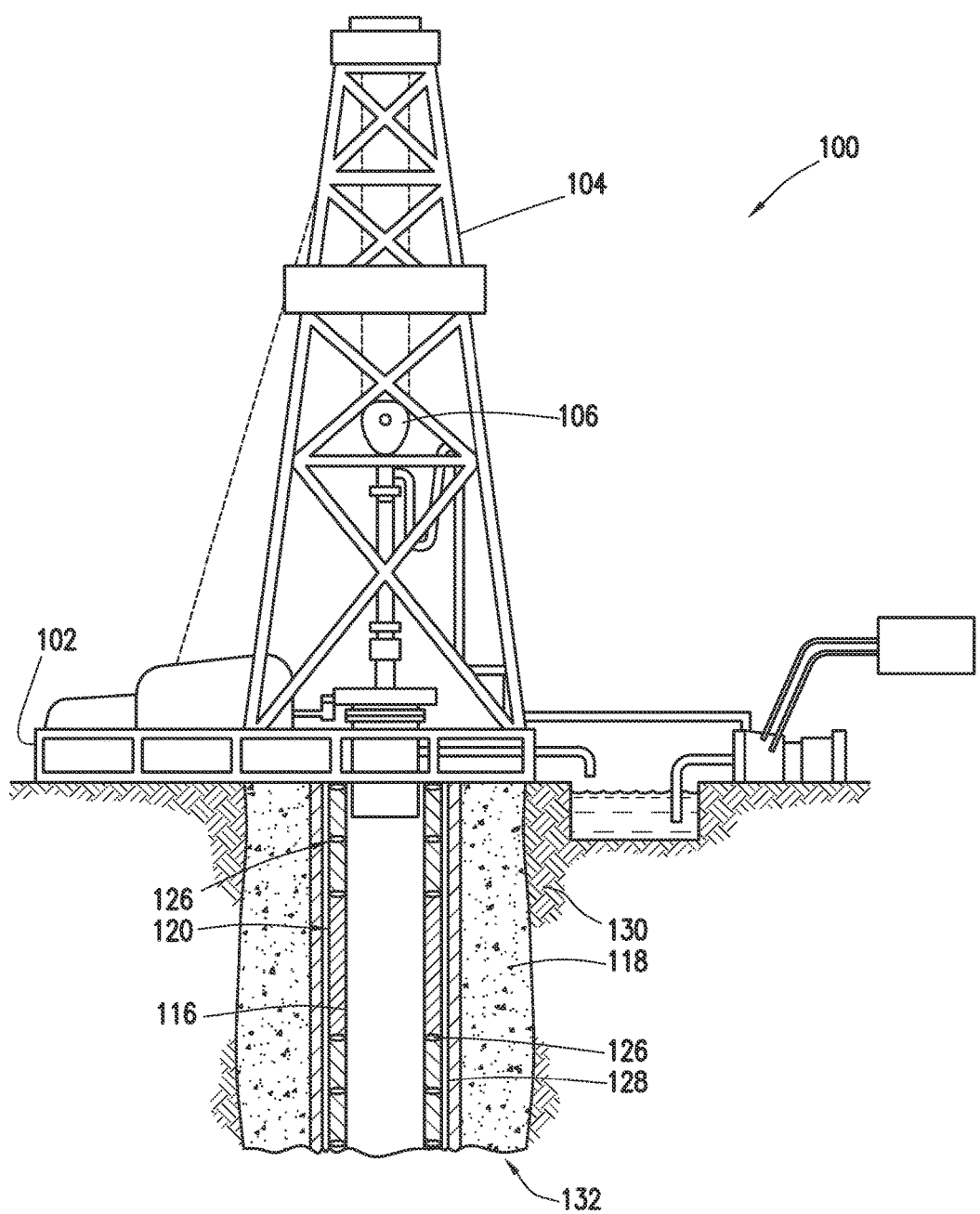
FIG. 1 shows a general view of an SCSSV installed in a wellbore in accordance with an illustrative embodiment of the present disclosure.

While embodiments of this disclosure have been depicted and described and are defined by reference to examples set forth in the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present invention relates to systems and methods for use in subterranean operations. More particularly, the present disclosure relates to a subsurface safety valve used in conjunction with such operations.

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Devices and methods in accordance with embodiments described herein may be used in one or more of MWD and LWD operations. Embodiments described below with respect to one implementation are not intended to be limiting.

The terms "couple" or "couples," as used herein are intended to mean either an indirect or a direct connection. Thus, if a first device couples to a second device, that connection may be through a direct connection, or through an indirect mechanical connection via other devices and connections. Similarly, a first component is "fluidically coupled" to a second component if there is a path for fluid flow between the two components. The terms "up" or "uphole" as used herein means along the drillstring or the hole from the distal end towards the surface, and "down" or "downhole" as used herein means along the drillstring or the hole from the surface towards the distal end. Further, the terms "up," "uphole," "down" and "downhole" are merely used to denote the relative location of different components and are not meant to limit the present disclosure to only a vertical well.

It will be understood that the term "well" is not intended to limit the use of the equipment and processes described herein to developing an oil well. The term also encompasses developing natural gas wells or hydrocarbon wells in general. Further, such wells can be used for production, monitoring, or injection in relation to the recovery of hydrocarbons or other materials from the subsurface.

The present application describes embodiments of a flapper and seat assembly for sealing a wellbore and sustaining an enhanced low pressure seal. As will be described below, certain embodiments may include the flapper and seat assembly of the present disclosure utilized within an SCSSV, as would be appreciated by one of ordinary skill in the art with the benefit of the present disclosure. In certain embodiments, a flapper and seat assembly in accordance with the present disclosure may include a tubular metallic seat having a bore therethrough, a hinge coupled to the tubular metallic seat, and a flapper pivotally mounted to the hinge such that it is rotatable between an open position and a closed position. As fully described below, the flapper and seat assembly disclosed herein may also include a secondary sealing element located between the flapper and the tubular metallic seat. In certain embodiments, a seal may be formed between a sealing surface of the flapper and a sealing surface of the tubular metallic seat.

Referring now to FIG. 1, oil well drilling equipment used in an illustrative drilling and completion environment is shown. A cross-sectional view of a wellbore 116 that has been drilled with casing 128 and tubing 126 in accordance with certain embodiments of the present disclosure is denoted generally with reference numeral 100. A drilling platform 102 supports a derrick 104 having a traveling block 106 for raising and lowering a drill string (not shown), wireline, slickline, or coiled tubing. An annulus 132 is formed between the casing 128 and the formation 130. Cement 118 is pumped down the wellbore 116, e.g., through the interior of the casing 128 and up through the annulus 132 where it sets and holds the casing 128 in place. The cement 118 may be directed downhole using a cement pumping unit (not shown) or other types of rig pumping equipment (not shown), as appropriate. The casing 128 and tubing 126 may be concentric tubes inside the wellbore 116. An SCSSV 120 may be installed in the wellbore 116 with tubing 126 coupled to each side as shown in FIG. 1. In such embodiments, the SCSSV 120 would be semi-permanently installed in the wellbore 116. In order to remove the SCSSV 120, the entire string of tubing 126 may be removed from the wellbore 116. In other embodiments, not shown in FIG. 1, the SCSSV 120 may be installed in the wellbore 116 on wireline, coiled tubing, or some other semi-flexible work string. In such embodiments, the SCSSV 120 may be installed in a profile that is communicatively coupled to a control line (not shown) that runs to the surface of the wellbore 116.

It will be appreciated that the present disclosure may be used in conjunction with any SCSSV, as would be appreciated by one of ordinary skill in the art. Specifically, as would be appreciated by one of ordinary skill in the art with the benefit of the present disclosure, the SCSSV 120 may be a wireline retrievable safety valve (WRSV), whereby the principal safety-valve components can be run and retrieved on slickline, or may be a tubing retrievable safety valve (TRSV), in which the entire safety-valve assembly is installed with the tubing string. The flapper valve assembly disclosed and described herein may be used with any other suitable SCSSV known to those of ordinary skill in the art without departing from the scope of this disclosure. Further, as would be appreciated by those of ordinary skill in the art, the methods and systems disclosed herein may be applicable to more than just SCSSVs.

Figure 2A:
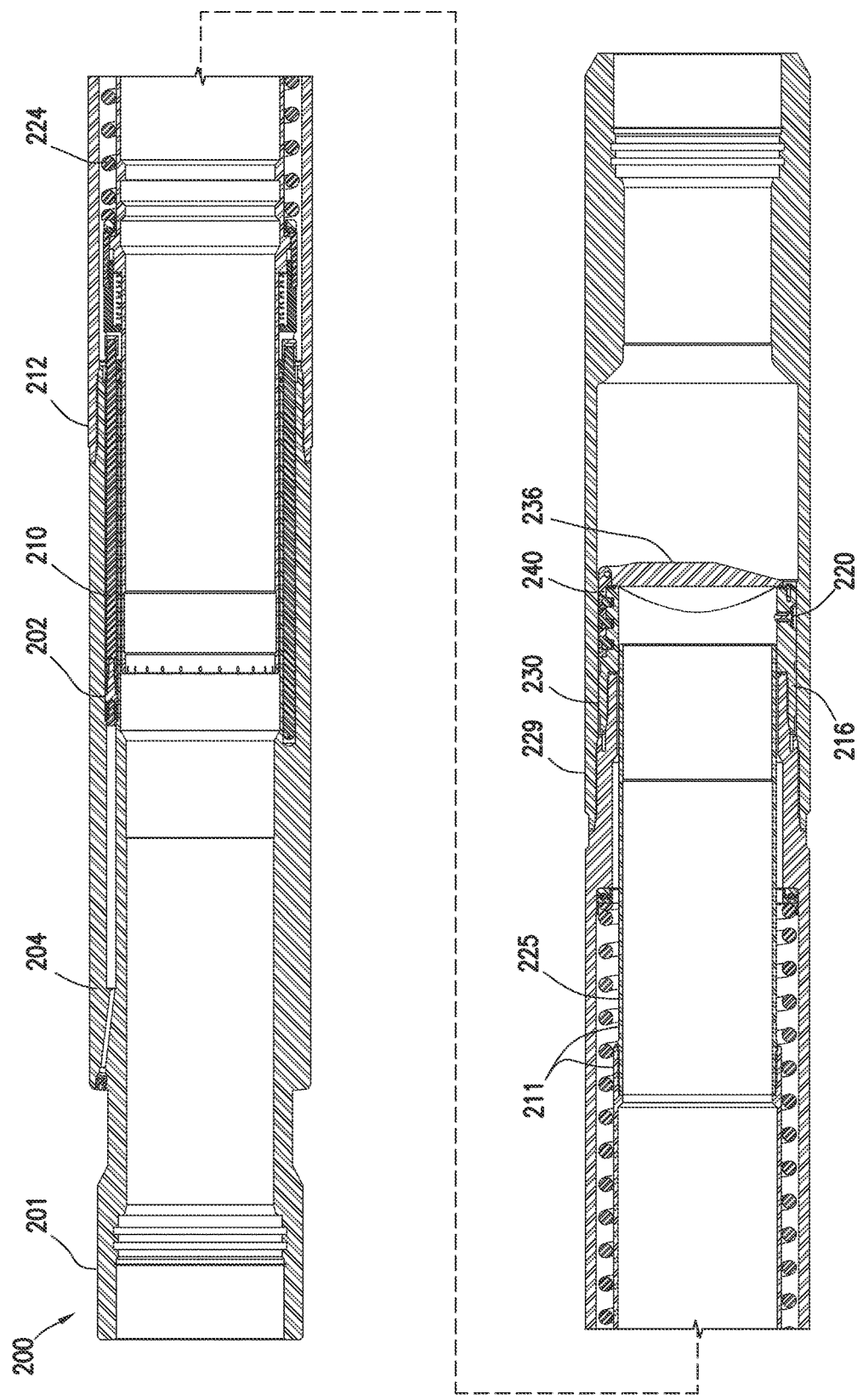
FIGS. 2A and 2B show an SCSSV in a closed and open position, respectively, in accordance with an illustrative embodiment of the present disclosure.

Turning now to FIG. 2A, an exemplary SCSSV is denoted generally with reference numeral 200. In certain embodiments, the SCSSV 200 may include a top sub 201, lower end of top sub 204, a spring housing 212, and a bottom sub 229. In certain embodiments, the top sub 201 may be coupled to the spring housing 212, and the spring housing 212 may be coupled to the bottom sub 229. In certain embodiments, the SCSSV 200 may include a rod piston assembly 202 and a rod piston 210 disposed within the lower end of the top sub 204. The rod piston 210 may be part of the rod piston assembly 202. The SCSSV 200 may further include a flow tube subassembly 211, which may further comprise an opening prong 225. In certain embodiments, the SCSSV 200 may further include a spring 224 disposed within the spring housing 212.

The SCSSV 200 may include a flapper and seat assembly 230 in accordance with an illustrative embodiment of the present disclosure. In the embodiment shown in FIG. 2A, a flapper and seat assembly 230 is shown in a closed position. The flapper and seat assembly 230 may be disposed within the bottom sub 229. The flapper and seat assembly 230 may include a tubular metallic seat 216, a flapper 236, and hinge 240, a spring-loaded poppet/equalization valve 220, and a secondary sealing element (not shown). When the flapper 236 is in the closed position, it may engage with the tubular metallic seat 216 and a secondary sealing element (not shown in FIGS. 2A and 2B), creating a seal in the wellbore. An exemplary flapper and seat assembly with a secondary sealing element in accordance with certain embodiments of the present disclosure, will be shown in and explained in further detail with reference to FIGS. 3A-3B, FIGS. 4A-4G, and FIGS. 5A-5C.

Figure 2B:
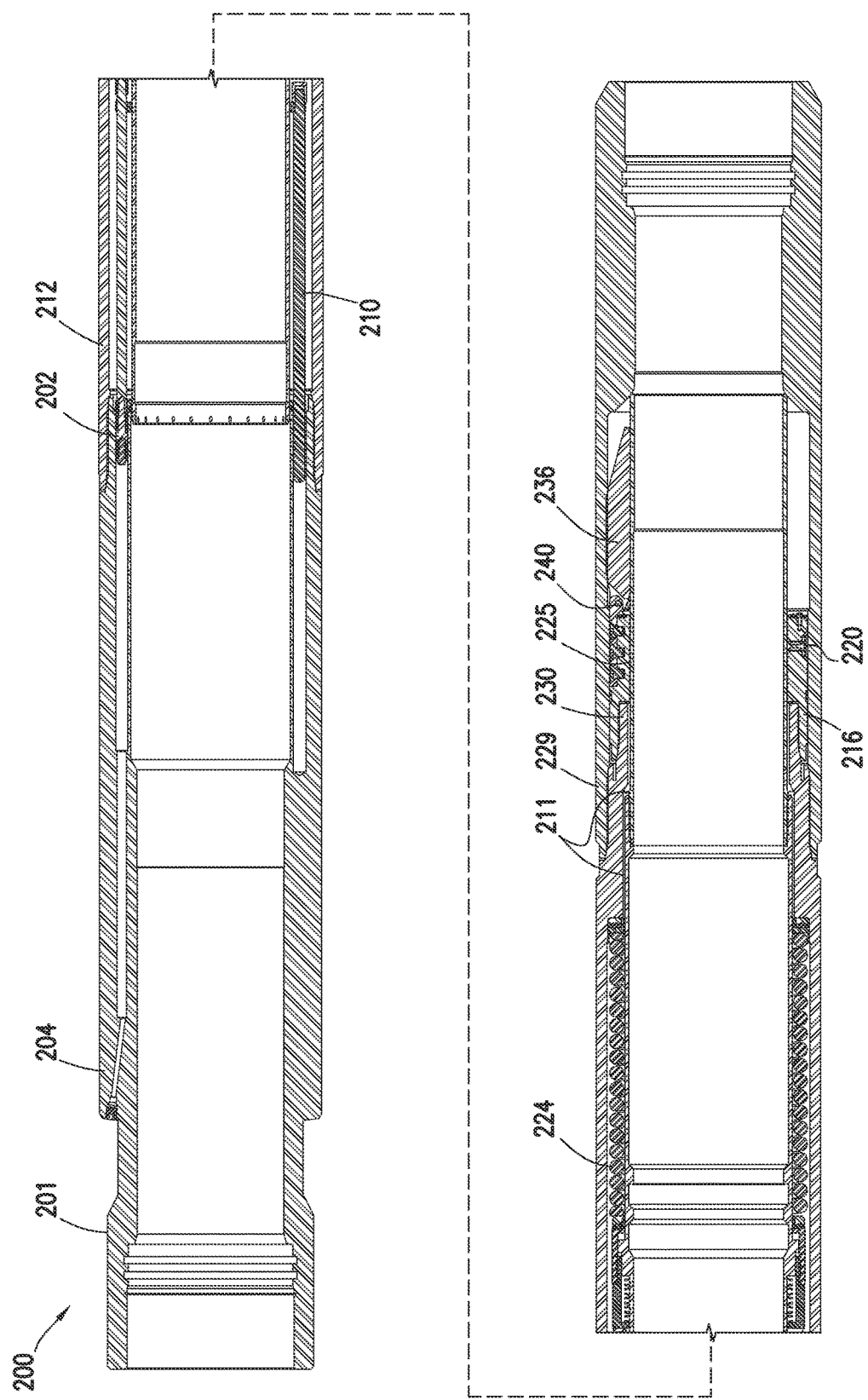

As is well known to those of ordinary skill in the art, the flapper 236 may be opened when the pressure above (i.e., uphole from) the flapper 236 is equalized with the pressure below (i.e., downhole from) the flapper 236. In certain embodiments, the well may be closed off at the surface with control valves at the wellhead (not shown). A hydraulically operated rod piston assembly 202 may be operable to move an opening prong 225 down to contact a spring-loaded equalizing poppet 220. In certain embodiments, the poppet 220 may be opened by the opening prong 225. Once the poppet 220 is opened, the well pressure may flow uphole to fill up the well above the closed flapper 236. Once the pressure is equalized (above and below the flapper 236), the rod piston assembly 202 may then push the flapper 236 to the fully opened position. The flapper 236 may then stay open until the hydraulic control line pressure is released through a control line at the surface (not shown). When the hydraulic pressure is released, the spring 224 will push the flow tube subassembly 211, including the opening prong 225, uphole to allow the flapper 236 to close. FIG. 2B shows the flapper 236 of FIG. 2A in an open position.

Figure 3A:
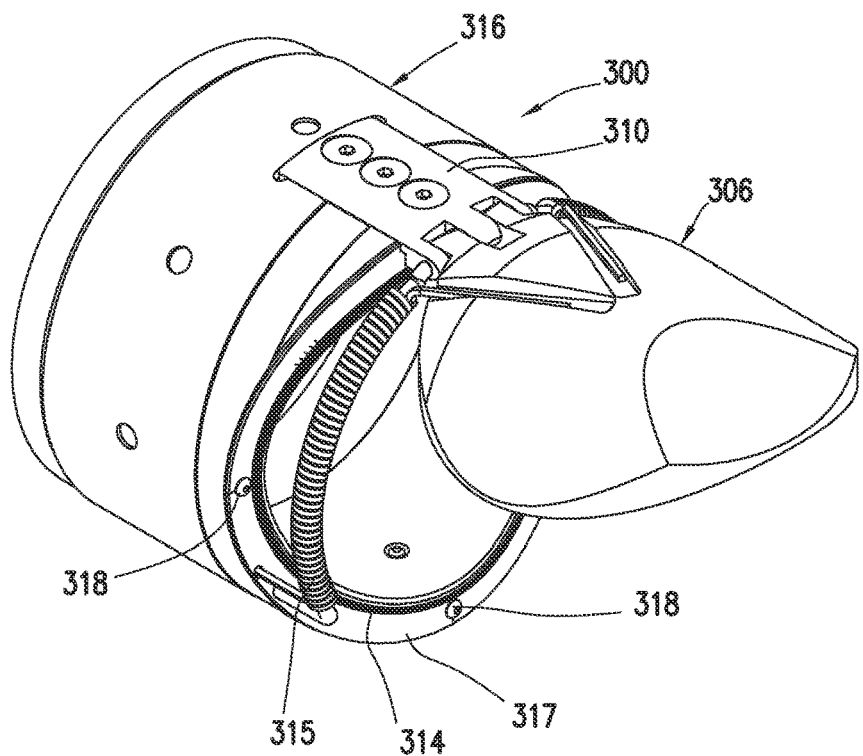
FIGS. 3A and 3B show schematic views of a flapper and seat assembly in accordance with an illustrative embodiment of the present disclosure where the flapper is in an open position.
Figure 3B:
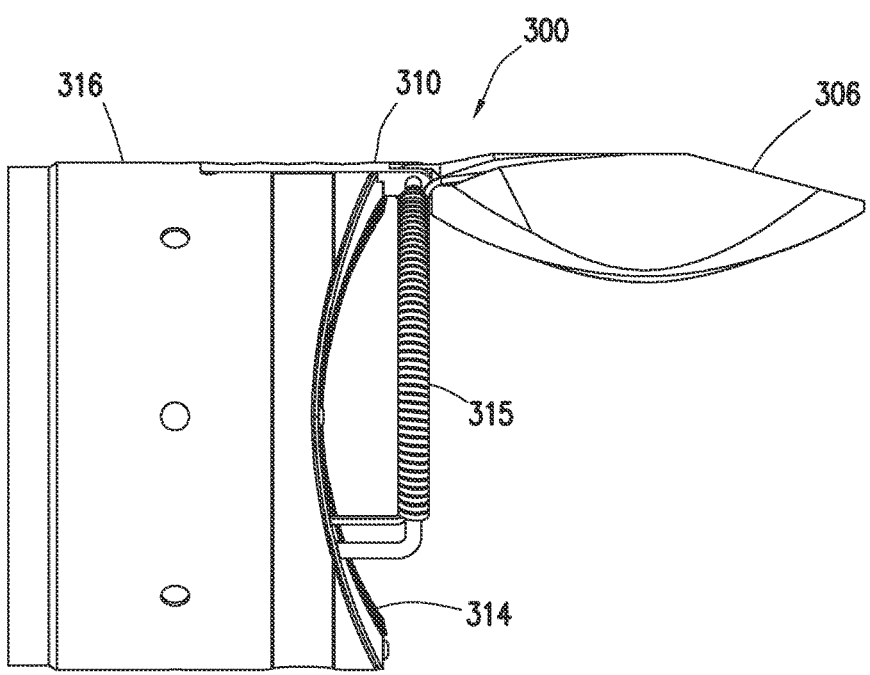

Turning now to FIGS. 3A-3B, a flapper and seat assembly 300 in an "open" position, in accordance with an illustrative embodiment of the present disclosure, is denoted generally with reference numeral 300. The flapper and seat assembly 300 may include a tubular metallic seat 316. In certain embodiments, the tubular metallic seat 316 may be a production tubing string or part of a production tubing string. In a preferred embodiment, the tubular metallic seat 316 may be a one piece unit. The flapper and seat assembly 300 may also include a flapper 306. The tubular metallic seat 316 may engage with the flapper 306. The flapper and seat assembly 300 may also include a hinge 310. The hinge 310 may be comprised of a metallic material. The hinge 310 may be coupled to the tubular metallic seat 316 and the flapper 306 via screws, pins, or any other suitable attaching mechanism known to those of ordinary skill in the art with the benefit of the present disclosure. The hinge 310 may be separately machined and manufactured from the tubular metallic seat 316 and flapper 306. Specifically, the hinge 310 may be comprised of any suitable very high-strength material known to those of ordinary skill in the art, including, but not limited to, MP35-N (UNS R30035). In certain embodiments in accordance with the present disclosure, the tubular metallic seat 316, the flapper 306, and the hinge 310 may all be comprised of different materials.

The flapper and seat assembly 300 may further include a secondary sealing element 314 and a seal retainer ring 317. The secondary sealing element 314 may be any pressure-energized soft seal known to those of ordinary skill in the art with the benefit of the present disclosure. For example, in certain embodiments, the secondary sealing element 314 may include, but is not limited to, a spring-loaded lip seal made from non-elastomeric materials such as Polytetrafluoroethylene ("PTFE") or Polyether Ether Ketone ("PEEK"), a spring-loaded PEEK or "PTFE" material, or any suitable material, such as rubber or any other suitable elastomeric materials such as the materials commonly used for O-ring seals such as AFLAS®, Fluorocarbon ("FKM"), Nitrile Butadiene rubber ("NBR"), or Carboxylated Nitrile ("XNBR"). The secondary sealing element 314 and the seal retaining ring 317 may be manufactured utilizing an additive manufacturing process or any other suitable process known to those of ordinary skill in the art with the benefit of the present disclosure. The secondary sealing element 314 and the seal retaining ring 317 are secured to the seat 316 by the hinge 310 and the screws 318. In certain embodiments, such as that illustrated in FIGS. 3A and 3B, the flapper 306 may be closed with flapper closure mechanism 315. The flapper closure mechanism 315 may be a flapper closure torsion spring, an extension spring with a closure beam, or any other suitable closure mechanism known to one of ordinary skill in the art. The undulating spring-loaded lip seal 314 is shown in further detail in FIGS. 5A-5C and described more fully with reference to those figures. The flapper closure mechanism 315 may be strong enough to apply sufficient force to lift the weight of the flapper 306 until it contacts the tubular metallic seat 316 and/or the secondary sealing element 314 after the flow tube subassembly (item 211 in FIGS. 2A and 2B) is pulled up through the flapper 306 by a helical compression spring (item 224 in FIGS. 2A and 2B). The flapper closure mechanism 315 may also be able to apply enough torsional force to rotate the flapper 306 into the flow stream so that the flapper does not "ride or surf" on the flow stream in an extremely high flow rate condition. This high flow rate condition could occur in a high pressure well in the event the wellhead is knocked off or experiences another emergency situation.

FIG. 3B shows a side-view of the flapper and seat assembly 300 in an open position, in accordance with the present disclosure. In a preferred embodiment, the flapper 306 may be curved. However, the present disclosure is not limited to any particular flapper shape. Accordingly, the flapper 306 used may be of any suitable shape without departing from the scope of the present disclosure. In certain embodiments, the flapper 306 may be comprised of a metallic material. The flapper 306 may be configured to pivot to the fully open position using the hinge 310, which is coupled or part of to the tubular metallic seat 316.

Figure 4A:
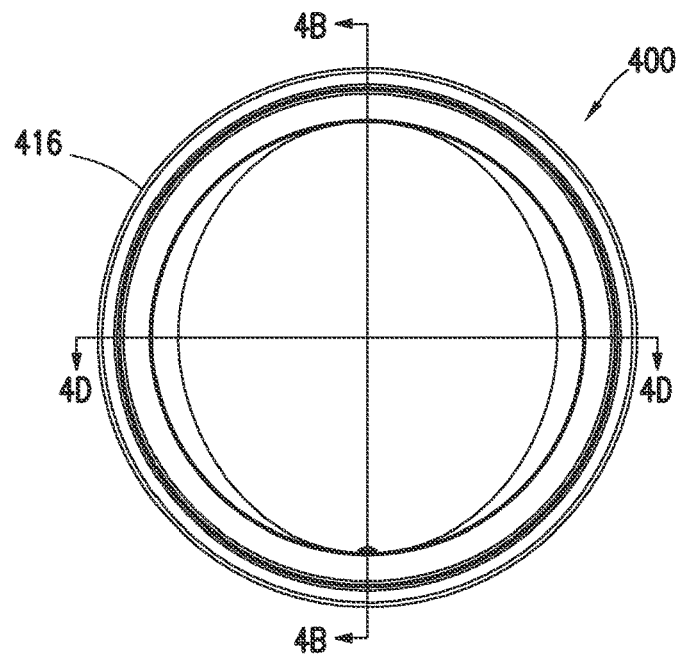
FIGS. 4A-4G show schematic views of a flapper and seat assembly in accordance with an illustrative embodiment of the present disclosure where the flapper is in a closed position.
Figure 4B:
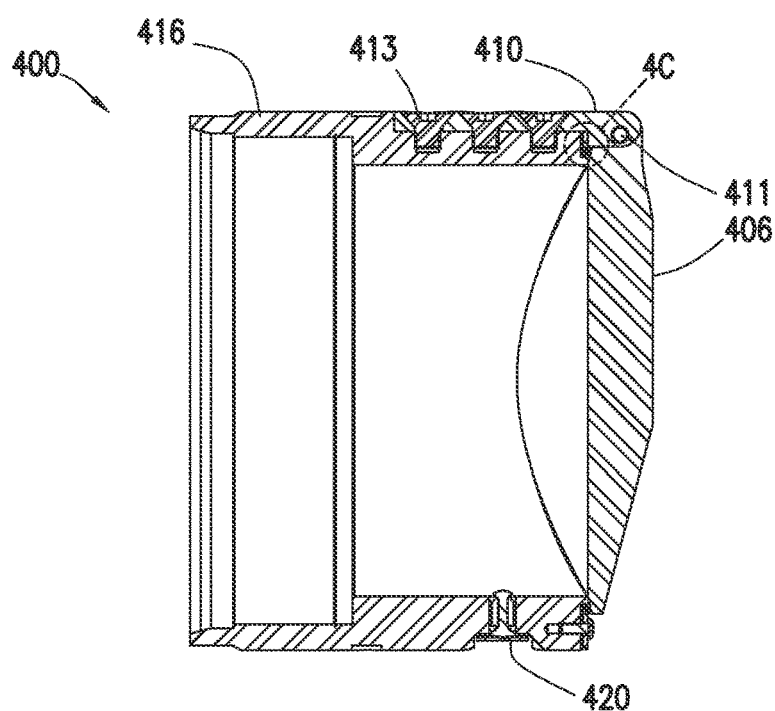

Turning now to FIGS. 4A-4G, a flapper and seat assembly 400 in a "closed" position, in accordance with an illustrative embodiment of the present disclosure, is denoted generally with reference numeral 400. FIG. 4A depicts a top view of a flapper and seat assembly 400 in a "closed" position. End view FIG. 4A is cross-sectioned in FIGS. 4B and 4C. Turning now to FIG. 4B, FIG. 4B depicts a cross-sectional view of the flapper and seat assembly 400 shown in FIG. 4A. As described with reference with FIGS. 3A and 3B, the flapper and seat assembly 400 may comprise a tubular metallic seat 416, a hinge 410, and a flapper 406. The hinge 410 may be coupled to the tubular metallic seat 416 via one or more hex screws 413. The flapper 406 may be rotationally coupled to the hinge 410 via one or more hinge pins 411.

Figure 4C:
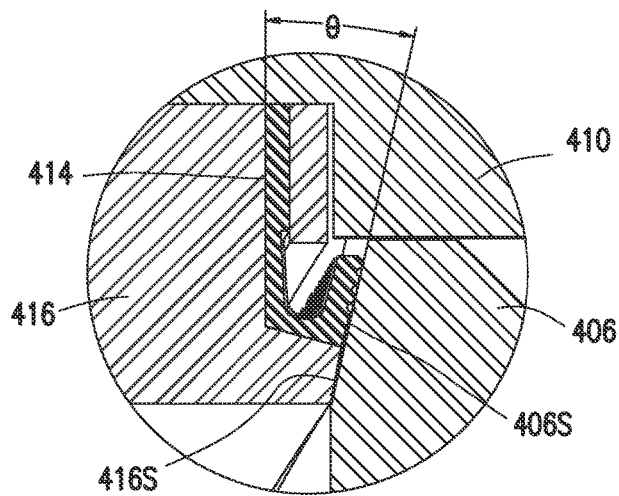

Further, as illustrated in the exemplary embodiment shown in FIG. 4B, the flapper 406 may engage with the tubular metallic seat 416 in the "closed" position. FIG. 4B shows the hinge 410 coupled to the tubular metallic seat 416 via the one or more hex screws 413, and also shows the flapper 406 coupled to the hinge 410 via the one or more hinge pins 411. In certain embodiments, flapper and seat assembly 400 may further include a spring-loaded poppet/equalization valve 420. The poppet 420 is shown in further detail in FIGS. 4F and 4G. As shown in FIG. 4F, the poppet 420 may be held in the closed position by a leaf spring 421. After the surface valves are closed in the well head tree (not shown), the opening prong (item 225 in FIGS. 2A and 2B) may be hydraulically forced down with pressure applied through the hydraulic control line to the rod piston assembly (item 202 in FIGS. 2A and 2B). The rod piston assembly (item 202 in FIGS. 2A and 2B) may move the flow tube subassembly (item 211 in FIGS. 2A and 2B) down until it presses against the inside end of the poppet 420, as illustrated in FIG. 4G. The flow tube subassembly (item 211 in FIGS. 2A and 2B) may further push the poppet 420 radially outward to open it. Since the sealing diameter of the closed poppet 420 is small, the poppet 420 may be opened against a large pressure differential pressure (e.g., 10,000 psi or any other suitable pressure rating). In certain embodiments, the opening prong (item 225 in FIGS. 2A and 2B) may not be able to overcome the large sealing area of the closed flapper 306 until the differential pressure below the flapper 306 is equalized with the pressure above the flapper 306. Once the pressure above the closed flapper 306 is about equal to the pressure below the flapper 306, the opening prong (item 225 in FIGS. 2A and 2B) may then push the flapper 306 to the fully open position.

As explained with reference to FIGS. 3A and 3B, the flapper and seat assembly 400 may further include a secondary sealing element 414. The secondary sealing element 414 is illustrated in further detail in FIG. 4C. Turning now to FIG. 4C, the secondary sealing element 414 is positioned between the tubular metallic seat 416 and flapper 406. In certain embodiments, the secondary sealing element 414 may be in a compressed position when the flapper 406 is in the closed position, and the secondary sealing element 414 may be in a partially decompressed position when the flapper 406 is in the open position.

In certain embodiments, a seal may be formed between a sealing surface 406S of the flapper 406 and a sealing surface 416S of the tubular metallic seat 416. In certain embodiments, this seal may be a metal-to-metal seal. In a preferred embodiment, the seal comprises an angle ⊖ between the flapper 406 and the tubular metallic seat 416. In a preferred embodiment, the angle ⊖ may be between 5 degrees and 30 degrees when measured from a plane perpendicular to the centerline of the flapper and seat assembly. The angle ⊖ may provide additional room in the assembly for the secondary sealing element 414. In certain embodiments, the sealing surfaces 406S and 416S may include a slope configured to generate reactive forces to center the flapper 406 into the tubular metallic seat 416. The angle ⊖ may be optimized to center the flapper 406 into the tubular metallic seat 416. In certain embodiments, the angle ⊖ may assist in centralizing the flapper 406 onto the tubular metallic seat 416. In this manner, the angle ⊖ may prevent the flapper 406 from moving from side to side. The angle ⊖ may also serve to reduce stress on the pins 411.

Figure 4D:
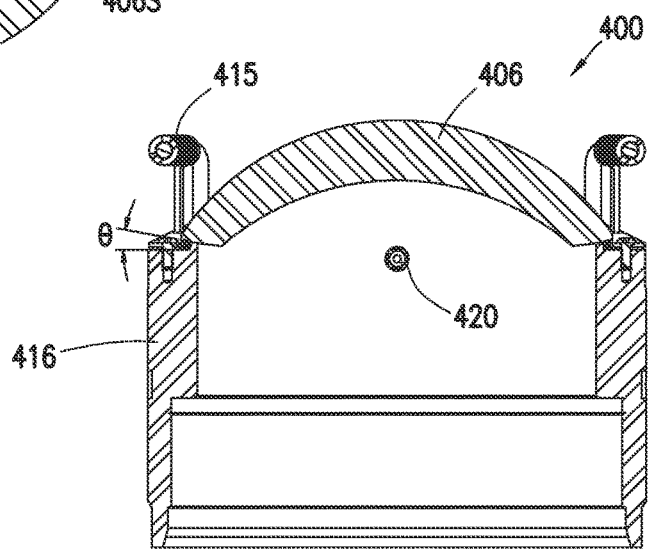

The angle ⊖ is further illustrated in FIG. 4D, which shows a second cross-sectional view of the flapper and seat assembly 400. FIG. 4D also shows the spring-loaded poppet/equalization valve 420, discussed above with respect to FIG. 4B.

In existing SCSSVs, well debris such as sand may prevent a metal-to-metal sealed flapper to seat closure mechanism from properly sealing and may prevent the flapper 306, 406 from coming into close contact with the tubular metallic seat 316, 416 and closing completely. In contrast, in the improved design disclosed herein, the secondary sealing element 314, 414 provides for enhanced low pressuring sealing. As a result, unlike typical prior art SCSSV designs, the flapper and seat assembly 300, 400 disclosed herein may result in improved sealing of low pressure gas. In practice, pressure may serve to push against the secondary sealing element 314, 414 even with the application of a lower pressure (e.g., 200 psi). At higher pressures the secondary sealing element 314, 414 may move to completely form a leak tight seal between the tubular metallic seat 316, 416 and the closed flapper 306, 406. In certain embodiments, when the flapper 306, 406 is opened with zero differential pressure across the flapper 306, 406, the secondary sealing element 314, 414 (which may be a flexible spring-loaded lip seal) may be trapped between a seal retaining ring 317 within the tubular metallic seat 316, 416 and the tubular metallic seat 316, 416 so secondary sealing element 314, 414 will not blow off.

Figure 4E:
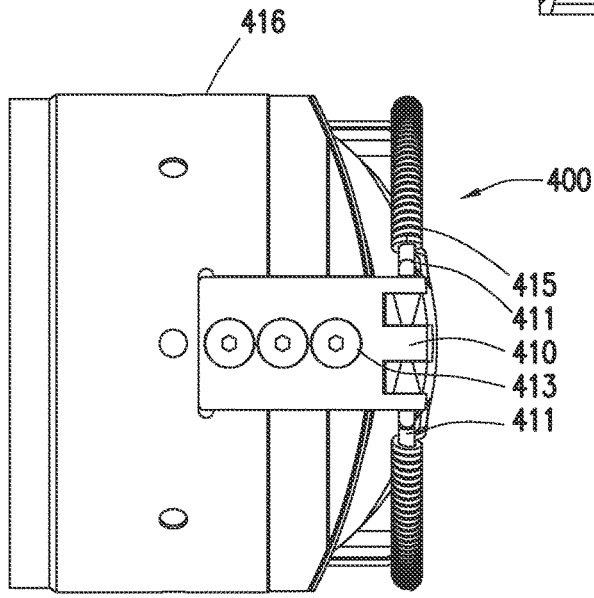
Figure 4F:
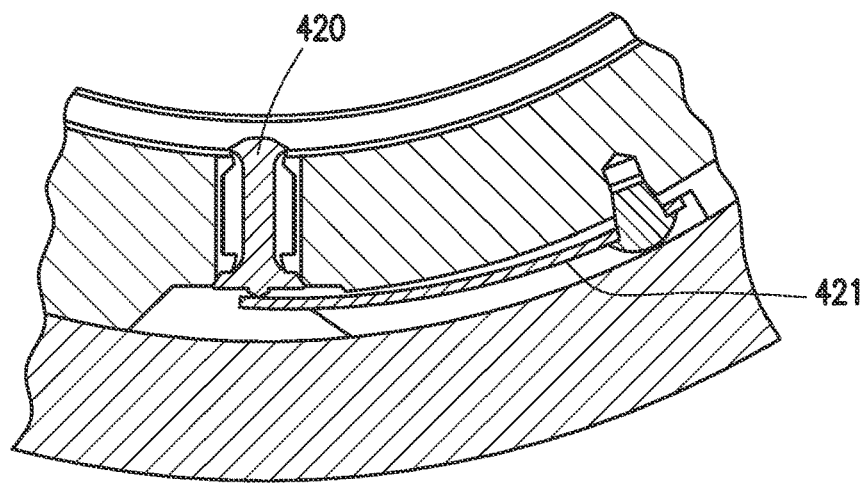
Figure 4G:
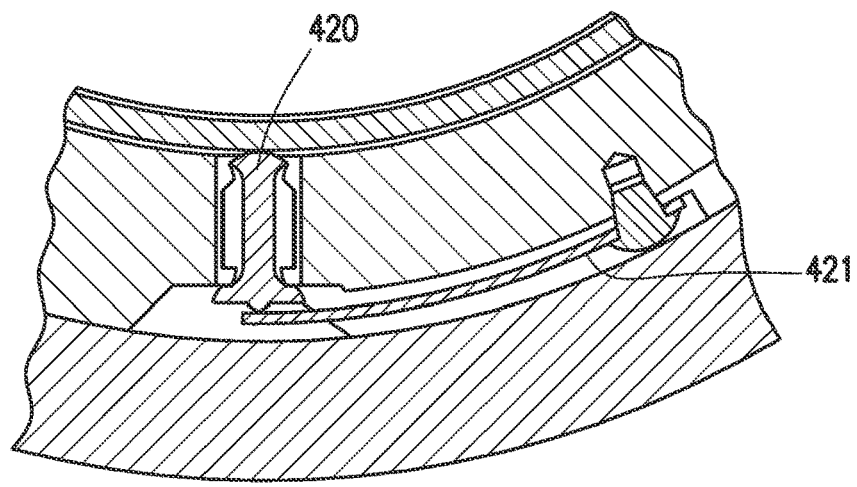

Turning now to FIG. 4E, FIG. 4E depicts a back view of the flapper and seat assembly 400 in the "closed" position. FIG. 4E clearly shows that the hinge 410 is separate and distinct from the tubular metallic seat 416. However, the hex screws 413 of the hinge 410 may couple the hinge 410 to the tubular metallic seat 416. In certain embodiments, two hinge pins 411 may act as a pivot for the flapper 406 and may serve as a guide for a flapper closure mechanism 415. The flapper closure mechanism 315 may be a flapper closure torsion spring, an extension spring with a closure beam, or any other suitable closure mechanism known to one of ordinary skill in the art, as described above with reference to FIGS. 3A and 3B.

Turning now to FIGS. 5A-5C, FIG. 5A shows a top view of a secondary sealing element 514. In certain embodiments, as explained above, the secondary sealing element 514 may be an undulating or curved spring-loaded lip seal. The undulating or curved shape of the seal 514 is required to closely match and seal against a lower sealing end of the tubular metallic seat (item 316 in FIGS. 3A and 3B, item 416 in FIGS. 4A-4E). A lower end of the lip seal 514 may match and substantially seal against the curved sealing face of the flapper 506. FIG. 5B illustrates a cross-sectional view of the secondary sealing element 514, and FIG. 5C shows the profile view of the secondary sealing element 514 in further detail. An undulating or curved spring 501 may be included in the spring loaded lip seal 514 to provide spring force to the lip of the seal so that may contact the curved sealing face of the flapper.

The flapper and seat assembly of the present disclosure may have a variety of uses. In an illustrative embodiment, and without limitation, the flapper and seat assembly of the present disclosure may be utilized in any suitable SCSSV, including a WRSV or a TRSV.

An embodiment of the present disclosure is a flapper and seat assembly. The flapper and seat assembly includes a tubular metallic seat having a bore therethrough. The tubular metallic seat is one solid unit. The flapper and seat assembly further includes a hinge coupled to the tubular metallic seat and a flapper. The flapper is pivotally mounted to the hinge such that it is rotatable between an open position and a closed position. The flapper and seat assembly also includes a secondary sealing element located between the flapper and the tubular metallic seat. The secondary sealing element is one of an undulating or curved lip seal. The flapper and seat assembly further includes a seal that is formed between a sealing surface of the flapper and a sealing surface of the tubular metallic seat. The seal comprises an angle measured from a plane perpendicular to the centerline of the flapper and seat assembly.

Optionally, the lip seal of the flapper and seat assembly is a spring-loaded lip seal. Optionally, the seal formed between the sealing surface of the flapper and the sealing surface of the tubular metallic seat is a metal-to-metal seal. Optionally, the hinge is comprised of a high-strength metallic material. Optionally, the angle is between 5 degrees and 30 degrees. Optionally, the angle is configured to generate reactive forces to center the flapper into the tubular metallic seat. Optionally, the secondary sealing element is in a compressed position when the flapper is in the closed position, and the secondary sealing element is in a partially decompressed position when the flapper is in the open position. Optionally, the tubular metallic seat is a tubular member that is retractable from a wellbore. Optionally, the flapper and seat assembly is one of permanently or semi-permanently installed in a wellbore.

Another embodiment of the present disclosure is a subsurface safety valve for controlling fluid flow in a wellbore. The subsurface safety valve includes a rod piston assembly which includes a rod piston. The rod piston assembly is disposed within a housing. The subsurface safety valve further includes a flow tube subassembly which includes an opening prong, and a spring disposed within a spring housing. The subsurface safety valve further includes a flapper and seat assembly, which includes a tubular metallic seat having a bore therethrough, a hinge coupled to the tubular metallic seat, and a flapper. The tubular metallic seat is one solid unit and the flapper is pivotally mounted to the hinge such that it is rotatable between an open position and a closed position. The flapper and seat assembly of the subsurface safety valve further includes a secondary sealing element located between the flapper and the tubular metallic seat, wherein the secondary sealing element is one of an undulating or curved lip seal. The flapper and seat assembly of the subsurface safety valve further includes a seal that is formed between a sealing surface of the flapper and a sealing surface of the tubular metallic seat. The seal comprises an angle that is measured from a plane perpendicular to the centerline of the flapper and seat assembly.

Optionally, the lip seal of the subsurface safety valve is a spring-loaded lip seal. Optionally, the seal formed between the sealing surface of the flapper and the sealing surface of the tubular metallic seat is a metal-to-metal seal. Optionally, the angle is between 5 degrees and 30 degrees. Optionally, the angle is configured to generate reactive forces to center the flapper into the tubular metallic seat.

Another embodiment of the present disclosure is a method of sealing a wellbore. The method includes the step of disposing a tubular metallic seat and a flapper in the wellbore. The tubular metallic seat is one solid unit. The method further includes the step of disposing a cylindrical flow tube subassembly with an opening prong within the tubular metallic seat, applying a pressure to the cylindrical flow tube subassembly through a single control line to move the flow tube subassembly through the flapper to open the flapper, coupling the flow tube subassembly to the tubular metallic seat, wherein movement of the flow tube subassembly is operable to at least one of open and close the flapper, and engaging the flapper with the tubular metallic seat. The flapper is pivotally mounted to a hinge that is coupled to the tubular metallic seat, and the flapper is rotatable between an open position and a closed position. The method further includes the steps of disposing a secondary sealing element between the flapper and the tubular metallic seat. The secondary sealing element is one of an undulating or curved lip seal. The method further includes the step of creating a seal between a sealing surface of the flapper and a sealing surface of the tubular metallic seat. The seal comprises an angle that is measured from a plane perpendicular to the centerline of the flapper and seat assembly.

Optionally, the secondary sealing element creates the seal between the sealing surface of the flapper and the sealing surface of the tubular metallic seat. Optionally, the angle is between 5 degrees and 30 degrees. Optionally, the angle is configured to generate reactive forces to center the flapper into the tubular metallic seat. Optionally, the method further includes the step of decompressing the rod piston. Optionally, decompressing the rod piston comprises removing pressure applied to the rod piston through a control line.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A flapper and seat assembly comprising:
   a tubular metallic seat having a bore therethrough, wherein the tubular metallic seat is one solid unit;
   a hinge coupled to the tubular metallic seat;
   a flapper, wherein the flapper is pivotally mounted to the hinge such that the flapper is rotatable between an open position and a closed position, wherein the flapper acts as a primary sealing element; and
   a secondary sealing element located between the flapper and the tubular metallic seat, wherein the secondary sealing element is one of an undulating or curved lip seal; and
   wherein a seal is formed between a sealing surface of the flapper and a sealing surface of the tubular metallic seat, and wherein the seal comprises an angle, wherein the angle is measured from a plane perpendicular to the centerline of the flapper and seat assembly, and wherein the undulating or curved lip seal forms a seal against a lower sealing end of the tubular metallic seat.

2. The flapper and seat assembly of claim 1, wherein the lip seal is a spring-loaded lip seal.

3. The flapper and seat assembly of claim 1, wherein the seal formed between the sealing surface of the flapper and the sealing surface of the tubular metallic seat is a metal-to-metal seal.

4. The flapper and seat assembly of claim 1, wherein the hinge is comprised of a high-strength metallic material.

5. The flapper and seat assembly of claim 1, wherein the angle is between 5 degrees and 30 degrees.

6. The flapper and seat assembly of claim 1, wherein the angle is configured to generate reactive forces to center the flapper into the tubular metallic seat.

7. The flapper and seat assembly of claim 1, wherein the secondary sealing element is in a compressed position when the flapper is in the closed position, and wherein the secondary sealing element is in a partially decompressed position when the flapper is in the open position.

8. The flapper and seat assembly of claim 1, wherein the tubular metallic seat is a tubular member that is retractable from a wellbore.

9. The flapper and seat assembly of claim 1, wherein the flapper and seat assembly is one of permanently or semi-permanently installed in a wellbore.

10. A subsurface safety valve for controlling fluid flow in a wellbore, comprising:
    a rod piston assembly comprising a rod piston, the rod piston assembly disposed within a housing;
    a flow tube subassembly comprising an opening prong;
    a spring disposed within a spring housing; and
    a flapper and seat assembly comprising:
      a tubular metallic seat having a bore therethrough, wherein the tubular metallic seat is one solid unit;
      a hinge coupled to the tubular metallic seat;
      a flapper, wherein the flapper is pivotally mounted to the hinge such that the flapper is rotatable between an open position and a closed position, wherein the flapper acts as a primary sealing element; and
      a secondary sealing element located between the flapper and the tubular metallic seat, wherein the secondary sealing element is one of an undulating or curved lip seal; and
    wherein a seal is formed between a sealing surface of the flapper and a sealing surface of the tubular metallic seat, wherein the seal comprises an angle and wherein the angle is measured from a plane perpendicular to the centerline of the flapper and seat assembly, and wherein the undulating or curved lip seal forms a seal against a lower sealing end of the tubular metallic seat.

11. The subsurface safety valve of claim 10, wherein the lip seal is a spring-loaded lip seal.

12. The subsurface safety valve of claim 10, wherein the seal formed between the sealing surface of the flapper and the sealing surface of the tubular metallic seat is a metal-to-metal seal.

13. The subsurface safety valve of claim 10, wherein the angle is between 5 degrees and 30 degrees.

14. The subsurface safety valve of claim 10, wherein the angle is configured to generate reactive forces to center the flapper into the tubular metallic seat.

15. A method of sealing a wellbore, comprising:
disposing a tubular metallic seat and a flapper in the wellbore, wherein the tubular metallic seat is one solid unit;
disposing a cylindrical flow tube subassembly with an opening prong within the tubular metallic seat;
applying a pressure to the cylindrical flow tube subassembly through a single control line to move the flow tube subassembly through the flapper to open the flapper;
coupling the flow tube subassembly to the tubular metallic seat, wherein movement of the flow tube subassembly is operable to at least one of open and close the flapper;
engaging the flapper with the tubular metallic seat;
wherein the flapper is pivotally mounted to a hinge that is coupled to the tubular metallic seat, and wherein the flapper is rotatable between an open position and a closed position, wherein the flapper acts as a primary sealing element; and
disposing a secondary sealing element between the flapper and the tubular metallic seat, wherein the secondary sealing element is one of an undulating or curved lip seal;
creating a seal between a sealing surface of the flapper and a sealing surface of the tubular metallic seat, wherein the seal comprises an angle and wherein the angle is measured from a plane perpendicular to the centerline of the flapper and seat assembly, and wherein the undulating or curved lip seal forms a seal against a lower sealing end of the tubular metallic seat.

16. The method of claim 15, wherein the secondary sealing element creates the seal between the sealing surface of the flapper and the sealing surface of the tubular metallic seat.

17. The method of claim 15, wherein the angle is between 5 degrees and 30 degrees.

18. The method of claim 15, wherein the angle is configured to generate reactive forces to center the flapper into the tubular metallic seat.

19. The method of claim 15, further comprising the step of decompressing the rod piston.

20. The method of claim 19, wherein decompressing the rod piston comprises removing pressure applied to the rod piston through a control line.

* * * * *